United States Patent
Tsuji

(10) Patent No.: US 10,144,351 B2
(45) Date of Patent: Dec. 4, 2018

(54) INFORMATION PRESENTATION SYSTEM

(71) Applicant: NISSAN MOTOR CO., LTD., Kanagawa (JP)

(72) Inventor: Masafumi Tsuji, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/578,119

(22) PCT Filed: May 29, 2015

(86) PCT No.: PCT/JP2015/065532
§ 371 (c)(1),
(2) Date: Nov. 29, 2017

(87) PCT Pub. No.: WO2016/194039
PCT Pub. Date: Dec. 8, 2016

(65) Prior Publication Data
US 2018/0154830 A1 Jun. 7, 2018

(51) Int. Cl.
*B60R 1/00* (2006.01)
*B60R 21/00* (2006.01)
*G06T 1/00* (2006.01)
*H04N 5/225* (2006.01)
*H04N 7/18* (2006.01)
(Continued)

(52) U.S. Cl.
CPC ............... *B60R 1/00* (2013.01); *B60R 21/00* (2013.01); *G06K 9/00805* (2013.01); *G06T 1/00* (2013.01); *H04N 5/225* (2013.01); *H04N 5/272* (2013.01); *H04N 7/18* (2013.01); *H04N 7/183* (2013.01); *B60R 2300/207* (2013.01); *B60R 2300/305* (2013.01); *B60R 2300/50* (2013.01); *B60R 2300/806* (2013.01); *H04W 24/08* (2013.01)

(58) Field of Classification Search
CPC .......... B60R 1/00; H04N 5/272; H04N 7/183; G06K 9/00805
See application file for complete search history.

(56) References Cited

U.S. PATENT DOCUMENTS

2005/0231341 A1  10/2005  Shimizu
2016/0227098 A1*  8/2016  Yasuhara .................. B60R 1/00

FOREIGN PATENT DOCUMENTS

JP  2003-259355 A  9/2003
JP  2011-175507 A  9/2011
(Continued)

*Primary Examiner* — Nam D Pham
(74) *Attorney, Agent, or Firm* — Osha Liang LLP

(57) ABSTRACT

An information presentation system includes an onboard device including a camera provided on a vehicle, and a terminal device having portability and performing wireless communication with the onboard device. The terminal device is configured to acquire an image around the vehicle captured by the camera, superimpose a distance marker on the image, the distance marker representing a distance from the vehicle, determine a delay state including a delay time of the wireless communication between the onboard device and the terminal device, and present the image on which the distance marker is superimposed. When the wireless communication is not delayed, the terminal device superimposes the distance marker on the image at a reference position at which a distance from the vehicle is a distance represented by the distance marker.

9 Claims, 14 Drawing Sheets

(51) Int. Cl.
      *G06K 9/00*           (2006.01)
      *H04N 5/272*        (2006.01)
      *H04W 24/08*       (2009.01)

(56) References Cited

FOREIGN PATENT DOCUMENTS

| | | |
|---|---|---|
| JP | 2011-259152 A | 12/2011 |
| JP | 2012-0162130 A | 8/2012 |
| WO | 2015/045578 A1 | 4/2015 |

\* cited by examiner

INFORMATION PRESENTATION SYSTEM

BACKGROUND

Technical Field

The present invention relates to an information presentation system that presents information regarding video footage (video image) around a vehicle.

Related Art

With regard to this kind of device, a drive assist device is known which displays video footage captured behind a vehicle when the shift lever of the vehicle is operated to the reverse position (Patent Document 1).

Patent Document 1 JP2012-0162130A

SUMMARY OF INVENTION

However, when a portable terminal device that is not incorporated in an onboard device acquires, via wireless communication, an image captured by an onboard camera and presents the captured image, a delay in the wireless communication may cause the timing of presenting the captured image becoming delayed.

One or more embodiments of the present invention allows the terminal device to appropriately present image information that represents a real-time state around the vehicle even when a delay occurs in the wireless communication between the onboard device and the terminal device.

According to one or more embodiments of the present invention, when the wireless communication is not delayed, a distance marker that represents a distance from the vehicle is superimposed on an image at a reference position at which the distance from the vehicle is a distance represented by the distance marker. When the wireless communication is delayed, the distance marker is superimposed on the image at a position at a traveling direction side of the vehicle than the reference position or a position at the vehicle side than the reference position.

According to one or more embodiments of the present invention, when the wireless communication is delayed, the distance marker is superimposed at a position at the traveling direction side of the vehicle than the reference position or a position at the vehicle side than the reference position. The driver can therefore be allowed to recognize a real time state around the vehicle even when the wireless communication between an onboard device and a terminal device is delayed.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Below, one or more embodiments will be described by exemplifying a case in which an information presentation system 1000 comprises an onboard device 200 that has one or more cameras provided on a vehicle and a portable terminal device 100 that is in wireless communication with the onboard device 200.

First Embodiment

Figure 1:
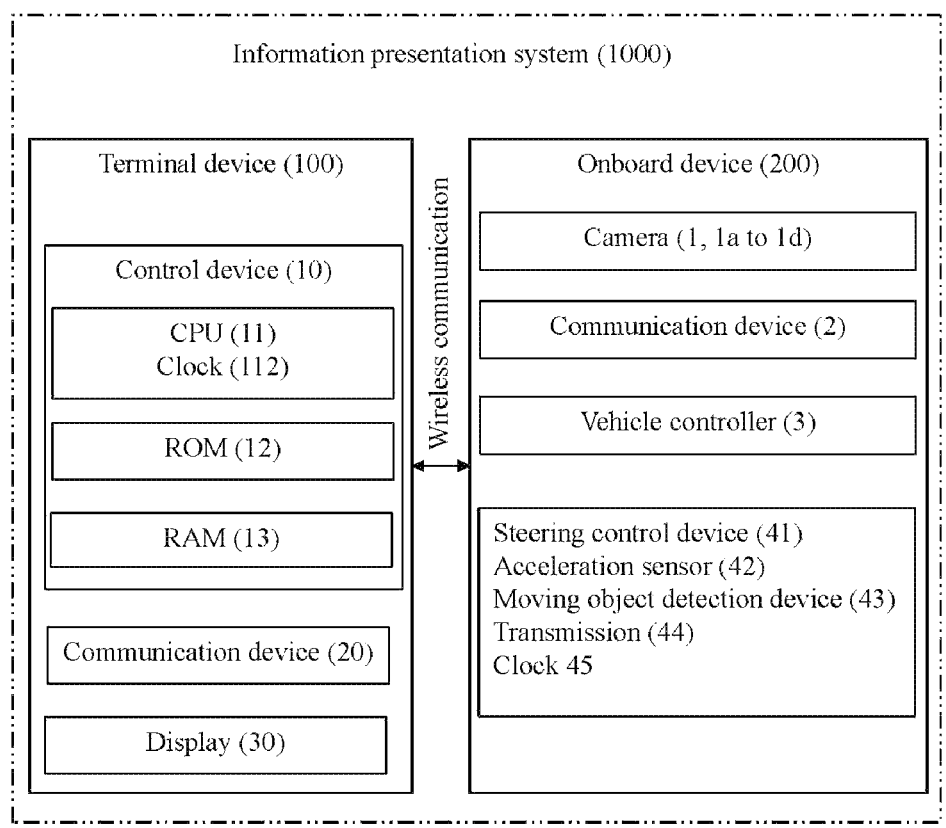
FIG. 1 is a block diagram of an information presentation system according to one or more embodiments of the present invention.

FIG. 1 is a block diagram of the information presentation system 1000 according to a first embodiment. The information presentation system 1000 comprises the onboard device 200 and the terminal device 100.

First, the onboard device 200 of the present embodiment will be described with reference to FIG. 1. The onboard device 200 comprises one or more cameras 1a to 1d, a communication device 2, a vehicle controller 3, and various types of devices 4 equipped on the vehicle (also referred to as "modules 4" in a collective term).

The one or more cameras 1a to 1d (also referred to as a "camera 1" or "cameras 1" in a collective term, here and hereinafter) are configured using imaging elements, such as charge coupled devices (CCD). In the present embodiment, these cameras include a camera 1 that is disposed at a predetermined position of a rear (rearward) portion of the vehicle, such as a rear finisher portion and roof spoiler portion. This camera 1 captures images of an object or road surface that exists in a space behind the vehicle (rearview or back view images). The term "behind the vehicle" as used herein encompasses not only the meaning of "just behind the vehicle," but also the meaning of "diagonally backward right of the vehicle" and "diagonally backward left of the vehicle." In particular, the onboard device 200 of the present embodiment includes a plurality of cameras 1a to 1d that are disposed at different positions outside the vehicle. More specifically, the onboard device 200 of the present embodiment includes cameras 1a to 1d that are each provided at a predetermined frontward position of the vehicle such as a front grille portion, at a predetermined left-side position of the vehicle such as a left-side mirror portion, or at a predetermined right-side position of the vehicle such as a right-side mirror portion. Each camera 1 captures video footage in a different direction around the vehicle. In the present embodiment, wide-angle cameras capable of imaging wide-angle images are used as the cameras 1.

The onboard device 200 transmits the images captured by the cameras 1 to the terminal device 100, which will be described later. In an alternative embodiment, at least one of the cameras 1 may have a wireless communication function to transmit the captured images to external. The terminal device 100 acquires the images captured by the cameras 1, via a wireless communication network. An image captured by each camera 1 is assigned with an identifier corresponding to the location (address) of the camera 1 and the terminal device 100 can identify each of the images captured by the camera 1, on the basis of the identifier. An image captured by each camera 1 is recorded with the time of capturing the image and the terminal device 100 can perceive the time of capturing each of the images captured by the camera 1.

The vehicle controller 3 acquires information from each module of the vehicle and comprehensively manages the operation of the vehicle. The vehicle controller 3 of the present embodiment acquires state information that represents a state of the vehicle. The vehicle controller 3 acquires steering information from a steering control device 41 of the vehicle as the state information, acquires acceleration information or speed information from an acceleration sensor 42 as the state information, and acquires shift position information of a transmission 44 of the vehicle as the state information. The vehicle controller 3 transmits the acquired steering information and/or acceleration information (or speed information) to the terminal device 100. The terminal device 100 includes a control device 10 which acquires a traveling direction (traveling angle) of the vehicle from the steering information. The control device 10 also acquires a traveling direction that represents whether the vehicle is traveling forward or backward from the shift position information. The control device 10 further acquires a traveling amount of the vehicle from the acceleration information (or speed information) and a traveling time. Thus, the control device 10 can obtain a position of the vehicle after a predetermined time passes, from the traveling direction and traveling amount of the vehicle.

The cameras 1, communication device 2, vehicle controller 3, and modules 4 of the onboard device 200 are connected with one another via a controller area network (CAN) or other onboard LAN and can mutually exchange information.

Next, the terminal device 100 will be described with reference to FIG. 1. The terminal device 100 of the present embodiment is a portable terminal device, such as a smartphone and tablet computer, which has a communication function. The terminal device 100 of the present embodiment comprises a control device 10, a communication device 20, and a display 30.

The communication device 20 of the present embodiment exchanges information mutually with the communication device 2 of the onboard device 200 separated from the terminal device 100. The communication device 20 acquires the captured images, information about the state of the vehicle, and other information from the onboard device 200.

Figure 2:
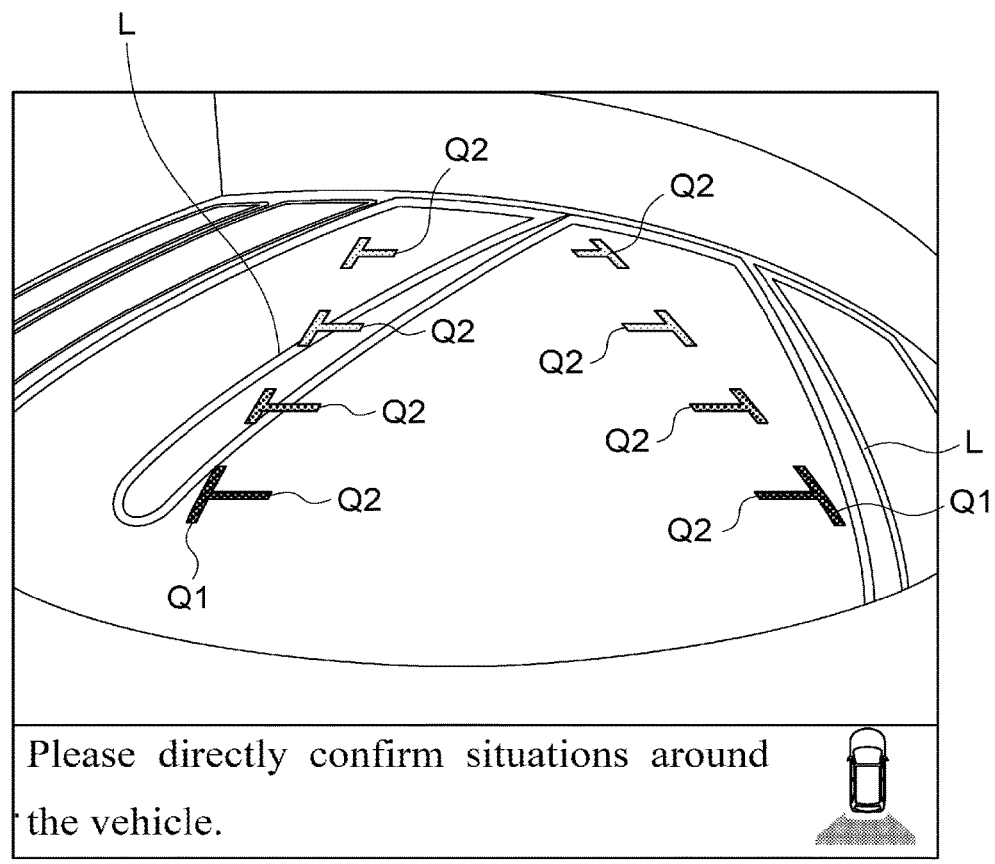
FIG. 2 is a view illustrating an example of an image displayed on a display of a terminal device of FIG. 1.

The display 30 of the present embodiment displays the images captured by the cameras 1 and information about a delay state of the wireless communication. FIG. 2 is a view illustrating an example of an image displayed on the display 30 of the terminal device 100. Specifically, FIG. 2 illustrates an image (back view image) in which an object and road surface existing in the space behind the vehicle are imaged by a camera 1 that is disposed at a predetermined position of a rear (rearward) portion of the vehicle (the same applies to FIGS. 5, 7, 9, and 11 to 13(B)).

As illustrated in FIG. 2, the image displayed on the display 30 is displayed together with guide lines that are along a trajectory on which the vehicle is predicted to travel. For example, the guide lines are displayed so as to be superimposed on the image. The guide lines superimposed on the image include vehicle width guide lines Q1 and distance guide lines Q2. Each distance guide line Q2 is a guide line that represents a distance from the subject vehicle (camera 1). In the present embodiment, the distance guide lines Q2 are superimposed at positions of 0.5 m, 1.0 m, 2.0 m, and 3.0 m from the subject vehicle. The distances represented by the distance guide lines Q2 are not limited to 0.5 m, 1.0 m, 2.0 m, and 3.0 m and can be appropriately set. In one or more embodiments of the present invention, the terminal device 100 can be placed in a holder attached to the instrument panel or in the vicinity of the steering of the vehicle so that the driver of the vehicle can easily recognize the terminal device 100.

The control device 10 of the terminal device 100 of the present embodiment comprises a read only memory (ROM) 12 that stores a program for superimposing the guide lines on the image captured by the camera 1 and displaying them on the display 30, a central processing unit (CPU) 11 as an operation circuit that executes the program stored in the ROM 12 thereby to function as the terminal device 100 of the present embodiment, and a random access memory (RAM) 13 that functions as an accessible storage.

The control device 10 of the terminal device 100 of the present embodiment has an image acquisition function of acquiring images captured by the cameras 1, a delay state determination function of determining a delay state of the wireless communication between the terminal device 100 and the onboard device 200, a guide line superimposition function of superimposing guide lines on an image captured by a camera 1, and an information presentation function of displaying the image, on which the guide lines are superimposed, on a display. The control device 10 is a computer that executes the above functions by cooperation of software for achieving each function and the above-described hardware. Each function achieved by the control device 10 will be described below.

The control device 10 uses the image acquisition function to acquire one or more images around the vehicle captured by the onboard cameras 1 from the onboard device 200 via the communication device 20. In the present embodiment, the control device 10 acquires one or more back view images behind the vehicle, but the present invention is not limited to this. In addition or alternatively, the control device 10 may acquire one or more front view images or sideward view images. In one or more embodiments of the present invention, the control device 10 may acquire a monitoring image around the subject vehicle which is generated by the onboard device 200 and in which the subject vehicle is viewed from a virtual viewpoint above the vehicle. The monitoring image is an overhead image generated by projecting a plurality of images, which are captured by the cameras 1 disposed at different positions on the subject vehicle, onto a projection plane in which the subject vehicle is viewed from a virtual viewpoint above the vehicle. The control device 10 uses the acquired captured images and/or monitoring image as information to be presented on the display 30 in a specific situation, such as when parking the subject vehicle and reversing the subject vehicle.

The control device 10 uses the delay state determination function to determine a delay state of the wireless communication between the onboard device 200 and the terminal device 100. The delay state of the wireless communication includes a delay time of the wireless communication. For example, the control device 10 uses the delay state determination function to obtain a difference between the time of capturing the image appended to the image acquired from the onboard device 200 and the time of acquiring the image, as the delay time. In one or more embodiments of the present invention, the control device 10 can use the delay state determination function to determine that the delay state of the wireless communication is in a communication disruption state when the wireless communication cannot be established between the terminal device 100 and the onboard device 200.

The control device 10 can also use the delay state determination function to obtain the delay time from a difference between a reference communication time under a predetermined good communication environment and an actually measured communication time under a communication environment in which the transmission and reception are actually performed. Although not particularly limited, the control device 10 can use the delay state determination function to calculate the delay time through referring to a clock 45 of the onboard device 200 and a clock 112 of the terminal device 100 to synchronize them with each other and then measuring the actual communication time required for information to be exchanged between the onboard device 200 and the terminal device 100 via the wireless communication. Specifically, the onboard device 200 transmits information to which the transmission timing is appended, to the terminal device 100. When acquiring the information, the terminal device 100 returns acknowledgement information to the onboard device 200. The onboard device 200 calculates half the time from the transmission timing when transmitting the information to the terminal device 100 to the reception timing when receiving the acknowledgement information transmitted from the terminal device 100, as the communication time required for the wireless communication. Similarly, the reference communication time can be calculated as a communication time for the wireless communication under a predetermined communication environment without communication load. The actually measured communication time varies from moment to moment in accordance with various factors, such as the number of terminal devices accessing the wireless communication line network and the volume of information to be exchanged. The control device 10 therefore uses the delay state determination function to acquire the communication time at a predetermined period and continuously calculates the delay time which is the difference from the reference communication time. According to the present embodiment, an accurate delay time can be calculated because the delay time is calculated after preliminarily synchronizing the onboard device 200 and the terminal device 100 with each other.

The delay time includes a regular time that is preliminarily determined in accordance with the capability of the communication facilities and a variable time that is caused by various factors, such as the communication volume. The regular time can be preliminarily stored in the onboard device 200 or the terminal device 100. In view of reducing the processing load, the regular delay time stored may be read out to determine the delay state.

Figure 3:
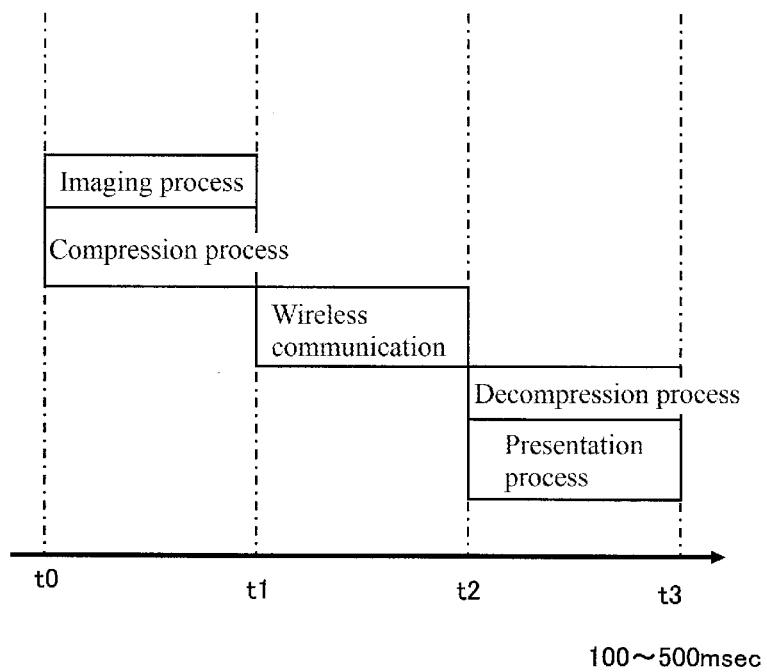
FIG. 3 is a chart for describing a delay in wireless communication.

Causes of occurrence of the delay state in presenting the image captured by the cameras 1 are not only the previously-described delay time of the wireless communication. The causes of the delay state include, as illustrated in FIG. 3, the first to third time periods as described below which are required to complete some processes from an image capturing process to an image presentation process. The first time period as referred to herein is a time from t0 to t1 during which the onboard device 200 performs a process to capture an image around the vehicle and a process to compress the image. The second time period is a time from t1 to t2 which is required for the wireless communication. The third time period is a time from t2 to t3 which is required for a process to decompress the compressed image and a process to present the decompressed image on the display 30. Thus, the delay state of the wireless communication occurs when a long period of time is taken for the processes performed at the onboard device 200 side from the time of capturing an image to the time of transmitting the image, for the communication between the onboard device 200 and the terminal device 100, and/or for the processes performed at the terminal device 100 side from the time of receiving the image to the time of presenting the image.

According to the communication technique at the time of filing the present application, when no delay occurs in the wireless communication, a time required to complete the presentation process for an image after the image capturing process is about 100 to 500 milliseconds. Even during such a short period of time, it is not preferred that the past image information is presented as if it is image information captured in real time. It is particularly undesirable if the communication delay occurs to prolong the time from the image capturing to the image presentation. When the image is transmitted and received using an internal communication network (such as CAN) in the onboard device 200, the time from the image capturing to the image presentation is substantially constant and can therefore be controlled uniformly. In contrast, when the image obtained at the onboard device 200 side is transmitted to the terminal device 100 via public wireless communication and presented using the display 30 of the terminal device 100, the delay of communication may have to be taken into consideration. In addition, the above-described third time period is highly dependent on the processing ability of the terminal device 100 and it is therefore difficult to uniformly define the delay time for the terminal device 100 which is individually and personally owned and has different performance and status.

With regard to the above-described second time period, the control device 10 uses the delay state determination function to measure the delay time of the wireless communication between the terminal device 100 and the onboard device 200 using the above scheme.

With regard to the above-described third time period, the control device 10 uses the delay state determination function for acquiring a terminal device-side processing time required for the terminal device 100 to present an image after acquiring the image, adding the terminal device-side processing time to the delay time of the wireless communication to calculate a delay time in the information presentation, and determining the delay state. Although not particularly limited, according to one or more embodiments of the present invention, the terminal device-side processing time is experimentally calculated in advance and stored in the terminal device 100 in a readable manner. The delay state can be correctly determined by not only calculating the delay of the wireless communication but also calculating a delay time through addition of the time required for the processes at the terminal device 100 side.

With regard to the above-described first time period, the control device 10 may use the delay state determination function to add, to the delay time, a time required for the processes performed at the onboard device 200 side from the time of acquisition of an image (image capturing) to the time of transmission of the image. The delay state can be further correctly determined by not only calculating the delay of the wireless communication but also calculating a delay time through addition of the time required for the processes at the onboard device 200 side.

The control device 10 can use the delay state determination function to determine whether or not the wireless communication with the communication device 2 is disrupted. When the wireless communication is disrupted, the display 30 can be controlled to present that the wireless communication is disrupted. In a situation in which the wireless communication with the communication device 2 is disrupted, it is difficult to acquire the captured image at the present moment in real time. In other words, it is highly possible that the captured image presented on the display 30 is originated from past video footage. According to the present embodiment, by presenting that the wireless communication with the communication device 2 is disrupted, it is possible to inform the driver that the presented captured image is not a real-time image.

The control device 10 may use the delay state determination function to determine a degree of reliability of the wireless communication in accordance with the delay state. When the delay time is long and the delay state of the wireless communication is bad, a determination is made that the degree of reliability of the wireless communication is low. On the other hand, when the delay time is short and the delay state of the wireless communication is not bad (communication state is good), a determination is made that the degree of reliability of the wireless communication is high. The degree of reliability of the wireless communication can be defined in accordance with the communication time in the communication state. As the communication time is longer, the degree of reliability of the wireless communication can be set lower. The control device 10 controls the display 30 to present the determined degree of reliability. In a situation in which the delay time of the wireless communication is long and the degree of reliability of the wireless communication is low, it is difficult to acquire the captured image at the present moment in real time. In other words, it is highly possible that the captured image presented on the display 30 is originated from past video footage. According to the present embodiment, by presenting that the degree of reliability of the wireless communication with the communication device 2 is low, it is possible to inform the driver that the presented captured image is not a real-time image.

The control device 10 uses the guide line superimposition function to generate guide lines. The guide lines include the vehicle width guide lines Q1 which represent positions of the side surfaces of the subject vehicle when the subject vehicle travels and the distance guide lines Q2 which represent positions along the traveling direction of the subject vehicle when the subject vehicle travels. Then, the control device 10 uses the guide line superimposition function to display the generated guide lines such that, as illustrated in FIG. 2, the guide lines are superimposed on the image captured by the camera 1. When the wireless communication between the terminal device 100 and the onboard device 200 is not delayed, the control device 10 uses the guide line superimposition function to superimpose each distance guide line Q2 at a position at which the distance from the subject vehicle is a distance represented by the distance guide line Q2.

Figure 4:
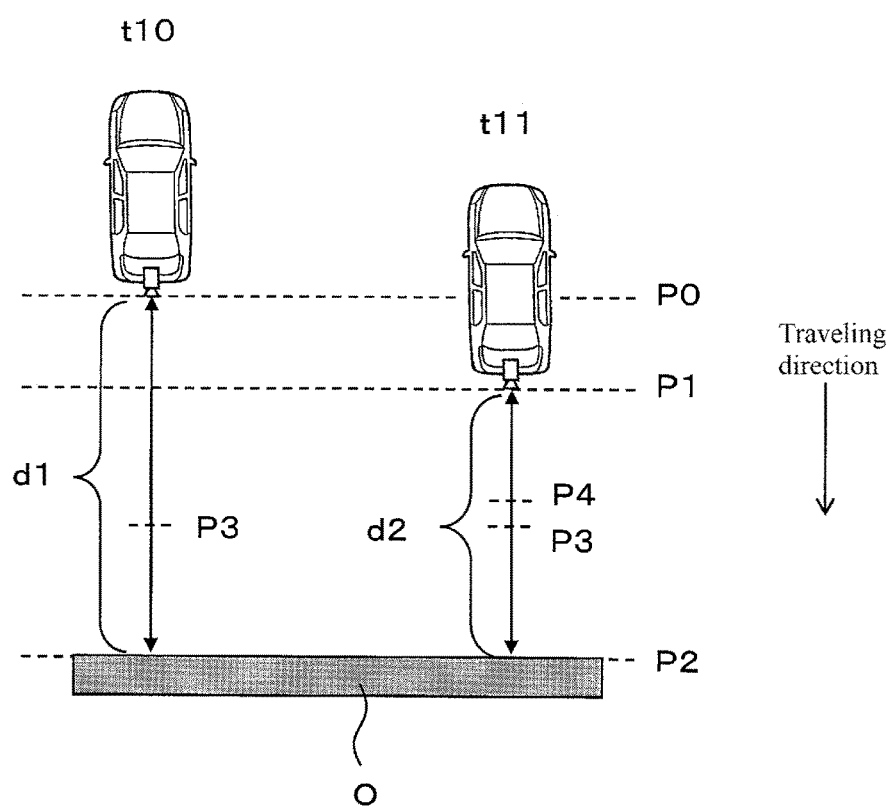
FIG. 4 is a view for describing a method of superimposing guide lines according to a first embodiment of the present invention.
Figure 5:
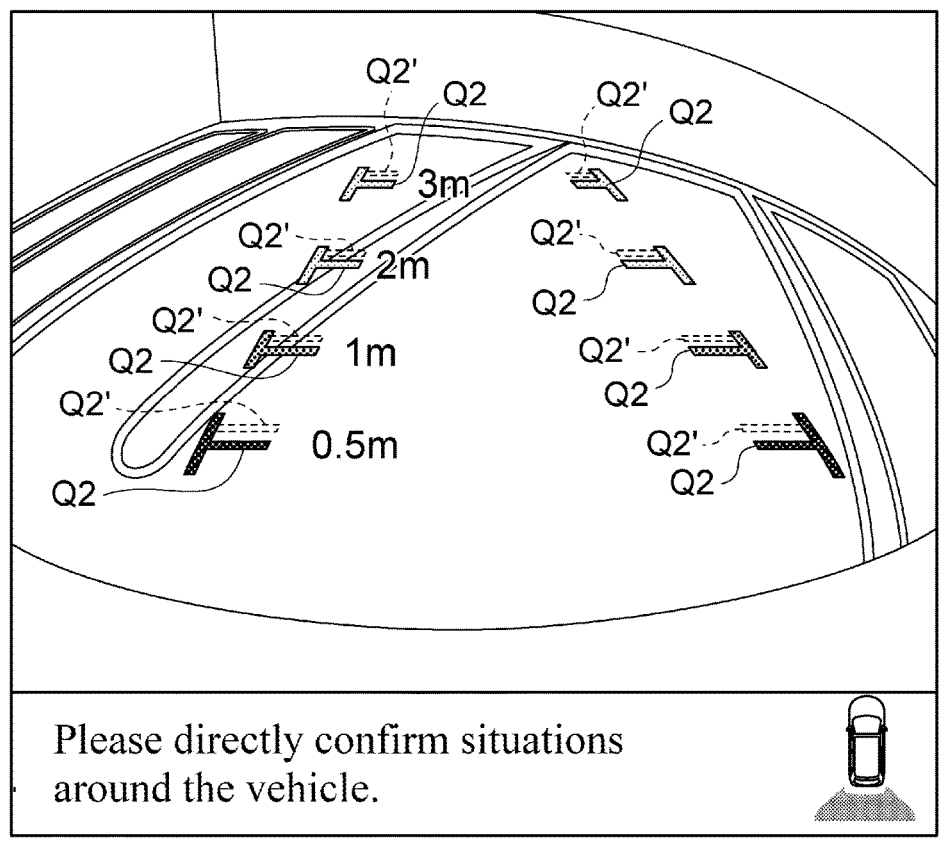
FIG. 5 is a view for describing the method of superimposing guide lines according to the first embodiment of the present invention.

On the other hand, when the wireless communication between the terminal device 100 and the onboard device 200 is delayed, the control device 10 uses the guide line superimposition function to determine superimposition positions of the guide lines on the image on the basis of the delay state of the wireless communication and the state of the subject vehicle acquired from the vehicle controller 3. A method of superimposing the guide lines according to the first embodiment of the present invention will be described below with reference to FIG. 4 and FIG. 5. FIG. 4 and FIG. 5 are views for describing the method of superimposing the guide lines in the first embodiment of the present invention. FIG. 4 and FIG. 5 illustrate an exemplary scene in which the subject vehicle travels backward to enter a parking space. The following description will be made on the assumption that the position on the image at which the distance from the subject vehicle (camera 1) is a distance represented by each distance guide line Q2 is a reference position Q2' for the distance guide line Q2.

When the wireless communication between the terminal device 100 and the onboard device 200 is delayed, the position of the vehicle at which the image is captured is a position at the delay time before, which is different from the current position of the subject vehicle. For example, in the scene illustrated in FIG. 4, it is assumed that the image illustrated in FIG. 5 is captured at a time t10. In the example illustrated in FIG. 4, however, the image captured at the time t10 is displayed on the display 30 of the terminal device 100 at a time t11 because the wireless communication is delayed. At the time t11, therefore, the actual position of the subject vehicle is a position P1 at the traveling direction side of the vehicle than a position P0 at which the image displayed on the display 30 is captured.

As illustrated in FIG. 4, when an obstacle O (such as a wall) exists at a position P2 at the traveling direction side of the subject vehicle and the wireless communication is delayed, a distance d2 from the actual position P1 of the subject vehicle to the obstacle O at the time t11 is shorter than a distance d1 from the position P0 at which the image displayed on the display 30 is captured to the obstacle O. That is, when the wireless communication is delayed, the subject vehicle is closer to the obstacle O than the position at which the image displayed on the display 30 is captured. When the wireless communication is delayed, therefore, in order to allow the driver to recognize that the subject vehicle is closer to the obstacle O than the case of no delay of the wireless communication, the control device 10 uses the guide line superimposition function to display each distance guide line Q2 such that the distance guide line Q2 is superimposed on the image at a position at the subject vehicle side (opposite side to the traveling direction of the subject vehicle) than the reference position Q2' at which the distance from the subject vehicle (camera 1) is a distance represented by the distance guide line Q2. In the present embodiment, the guide lines include a plurality of distance guide lines Q2 and each distance guide line Q2 is therefore displayed such that the distance guide line Q2 is superimposed at a position at the subject vehicle side than the reference position Q2' for the distance guide line Q2.

For example, in the example illustrated in FIG. 4, it is assumed that P3 represents a reference position Q2' (e.g. a position that represents a distance of 1.0 m from the subject vehicle) for the distance guide line Q2 in the image captured at the time t10. In this case, the image captured at the time t10 is displayed at the time t11 and, therefore, the position in the image at which the distance from the subject vehicle is a distance represented by the distance guide line Q2 is the position P3. Nevertheless, in such a case, the control device 10 uses the guide line superimposition function to display the distance guide line Q2 such that the distance guide line Q2 is superimposed at a position P4 at the subject vehicle side than the position P3. This allows the position P4, at which the distance guide line Q2 is superimposed and displayed on the image displayed by the display 30, to be a position nearer to the subject vehicle than the position P3 which is the reference position Q2'. Thus, in the present embodiment, the distance guide line Q2 is made closer to the subject vehicle on the image, as illustrated in FIG. 5, by a distance in which the subject vehicle actually travels with respect to the image capturing position. Through this operation, the distance represented by the distance guide line Q2 (e.g. 1.0 m from the subject vehicle) is not changed, but the driver can recognize the distance from the subject vehicle to the position represented by the distance guide line Q2 (e.g. a distance of 1.0 m from the subject vehicle) as if the distance is relatively shortened as compared with the case in which the distance guide line Q2 is superimposed at the reference position Q2' and displayed. Consequently, when the obstacle O exists in the traveling direction of the subject vehicle, for example, the driver can recognize the distance from the subject vehicle to the obstacle O as if the distance is a relatively short distance.

When the wireless communication is delayed, the control device 10 uses the guide line superimposition function to estimate a traveling amount from the position at which the image is captured to the current position of the subject vehicle on the basis of the state information, such as a vehicle speed and steering information of the subject vehicle, and the delay time of the wireless communication. Each distance guide line Q2 is thus displayed such that the distance guide line Q2 is superimposed at the position at the subject vehicle side than the reference position Q2' by an amount corresponding to the estimated traveling amount. For example, in the example illustrated in FIG. 4, the control device 10 uses the guide line superimposition function, at the time t11, to estimate a traveling amount from the position P0 at which the image is captured to the current position P1 of the subject vehicle. Then, the control device 10 uses the guide line superimposition function to display each distance guide line Q2 such that the distance guide line Q2 is superimposed at the position P4 which is shifted from the reference position Q2' toward the subject vehicle side by an amount corresponding to the estimated traveling amount. In an alternative embodiment, the control device 10 may use the guide line superimposition function to display each distance guide line Q2 such that the distance guide line Q2 is superimposed at a position at the subject vehicle side than the reference position Q2' by a predetermined traveling amount.

As illustrated in FIG. 5, for example, the control device 10 uses the information presentation function to control the display 30 to display an image on which the guide lines are superimposed using the guide line superimposition function. FIG. 5 illustrates the reference positions Q2' for descriptive purposes, but when the image is displayed on the display 30, the reference positions Q2' are not displayed (the same applies to FIGS. 7 and 9, which will be described later).

Figure 6:
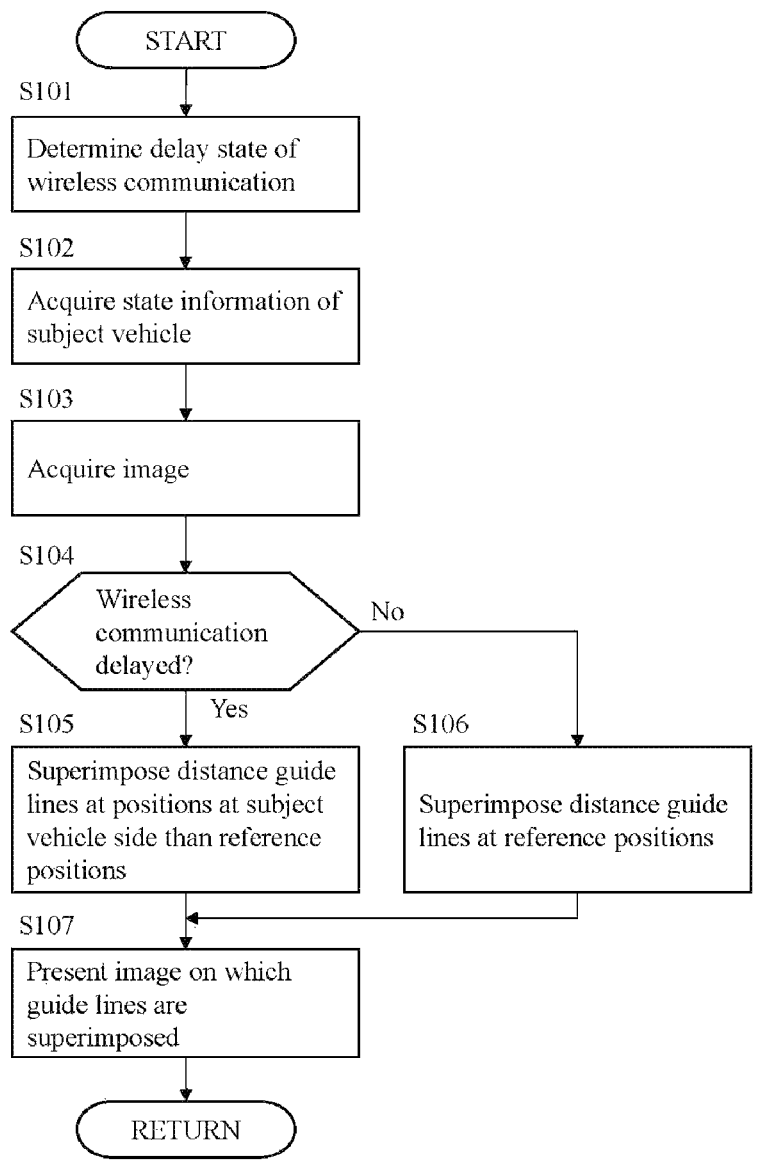
FIG. 6 is a flowchart illustrating an information presentation process according to the first embodiment of the present invention.

Next, the information presentation process according to the first embodiment will be described. FIG. 6 is a flowchart illustrating the information presentation process according to the first embodiment. The information presentation process illustrated in FIG. 6 is executed by the control device 10 of the terminal device 100.

In step S101, the control device 10 uses the delay state determination function to make a determination as to the delay state of the wireless communication between the terminal device 100 and the onboard device 200. Specifically, the control device 10 uses the delay state determination function to determine whether or not the wireless communication is established between the terminal device 100 and the onboard device 200 and, when the wireless communication is established, determine a delay time of the wireless communication. In one or more embodiments of the present invention, when the wireless communication is not established (when the wireless communication is disrupted), the control device 10 may use the information presentation function to display this fact on the display 30.

In step S102, the control device 10 uses the guide line superimposition function to acquire the state information of the subject vehicle. For example, the control device 10 can use the guide line superimposition function to acquire the state information, such as a vehicle speed, acceleration, steering angle, and traveling direction of the subject vehicle, from the vehicle controller 3.

In step S103, the control device 10 uses the image acquisition function to acquire an image around the subject vehicle captured by a camera 1. Then, in step S104, the control device 10 uses the guide line superimposition function to determine whether or not the wireless communication between the terminal device 100 and the onboard device 200 is delayed, on the basis of the determination result in step S101 of the delay state of the wireless communication. When the wireless communication is delayed, the routine proceeds to step S105 while when the wireless communication is not delayed, the routine proceeds to step S106. In one or more embodiments of the present invention, when the wireless communication is merely delayed for a certain period of time (e.g. 200 msec) or less, a determination may be made that the wireless communication is not delayed, and the routine may proceed to step S106.

In step S106, the control device 10 uses the guide line superimposition function to perform a process of superimposing the guide lines on the image acquired in step S103. The determination is already made that the wireless communication is not delayed and, therefore, in step S106, the control device 10 uses the guide line superimposition function to display each distance guide line Q2, which represents a distance from the subject vehicle, such that the distance guide line Q2 is superimposed at a position (reference position Q2') at which the distance from the subject vehicle is a distance represented by the distance guide line Q2.

When a determination is made in step S104 that the wireless communication is delayed, the routine proceeds to step S105. In step S105, the control device 10 uses the guide line superimposition function to display each distance guide line Q2 such that the distance guide line Q2 is superimposed on the image at a position at the subject vehicle side (opposite side to the traveling direction of the subject vehicle) than the reference position Q2' at which the distance from the subject vehicle is a distance represented by the distance guide line Q2. For example, the control device 10 uses the guide line superimposition function to estimate a traveling amount from the position at which the image is captured to the current position of the subject vehicle on the basis of the determination result in step S101 of the delay state of the wireless communication and the state (e.g. vehicle speed and steering angle) of the subject vehicle acquired in step S102 and display each distance guide line Q2 such that the distance guide line Q2 is superimposed at the position which is shifted from the reference position Q2' toward the subject vehicle side by an amount corresponding to the estimated traveling amount.

Then, in step S107, the control device 10 uses the information presentation function to present the image, on which the guide lines are superimposed in step S105 or step S106, on the screen of the display 30.

As described above, the information presentation system 1000 according to the first embodiment determines positions for superimposing the distance guide lines Q2 on the image captured by the camera 1, on the basis of the delay state of the wireless communication. This allows the driver to recognize the real time state around the vehicle on the image even when the wireless communication between the terminal device 100 and the onboard device 200 is delayed.

This will be more specifically described. In the present embodiment, when the wireless communication is delayed, each distance guide lines Q2 is superimposed on the image, as illustrated in FIG. 5, at a position at the subject vehicle side (opposite side to the traveling direction of the subject vehicle) than the reference position Q2' at which the distance from the subject vehicle is a distance represented by the distance guide line Q2. Moreover, a traveling amount of the subject vehicle during the delay time is estimated on the basis of the state (such as a vehicle speed and steering angle) of the subject vehicle and the delay time and each distance guide line Q2 is displayed such that the distance guide line Q2 is superimposed at the position which is shifted from the reference position Q2' toward the subject vehicle side by an amount corresponding to the estimated traveling amount. Thus, in the present embodiment, the distance guide line Q2 is made closer to the subject vehicle on the image by a distance in which the subject vehicle actually travels with respect to the image capturing position. The driver can therefore recognize the distance from the subject vehicle to the position represented by the distance guide line Q2 (e.g. a distance of 1.0 m from the subject vehicle) as if the distance is relatively short as compared with the case in which the distance guide line Q2 is superimposed at the reference position Q2' and displayed. Consequently, when the obstacle O exists in the traveling direction of the subject vehicle, for example, the driver can recognize the distance from the subject vehicle to the obstacle O as if the distance is a relatively short distance.

Second Embodiment

Next, an information presentation system 1000 according to a second embodiment of the present invention will be described. The information presentation system 1000 according to the second embodiment has the same configuration as that of the information presentation system 1000 according to the first embodiment and performs similar operations to those of the information presentation system 1000 according to the first embodiment except that the information presentation system 1000 according to the second embodiment operates as described below.

In the second embodiment, the control device 10 of the terminal device 100 further has a moving object detection information acquisition function of detecting a moving object in addition to the functions according to the first embodiment.

The control device 10 uses the moving object detection information acquisition function to acquire detection information as to whether or not a moving object exists around the subject vehicle. Specifically, the control device 10 uses the moving object detection information acquisition function to acquire the information as to whether or not a moving object exists from the onboard device 200. The onboard device 200 includes a moving object detection device 43. The moving object detection device 43 determines whether or not a moving object exists around the vehicle, on the basis of a variation with time of features that are extracted from images captured by the camera or cameras 1. The scheme of detecting a moving object on the basis of the captured images is not particularly limited and a scheme known at the time of filing the present application can be appropriately utilized.

In the second embodiment, when the wireless communication is delayed, the control device 10 uses the guide line superimposition function to determine whether or not detection information that a moving object exists is acquired by the moving object detection information acquisition function. When a moving object exists, the control device 10 uses the guide line superimposition function to change positions of guide lines to be superimposed on the captured image, on the basis of a distance to the moving object.

Figure 7:
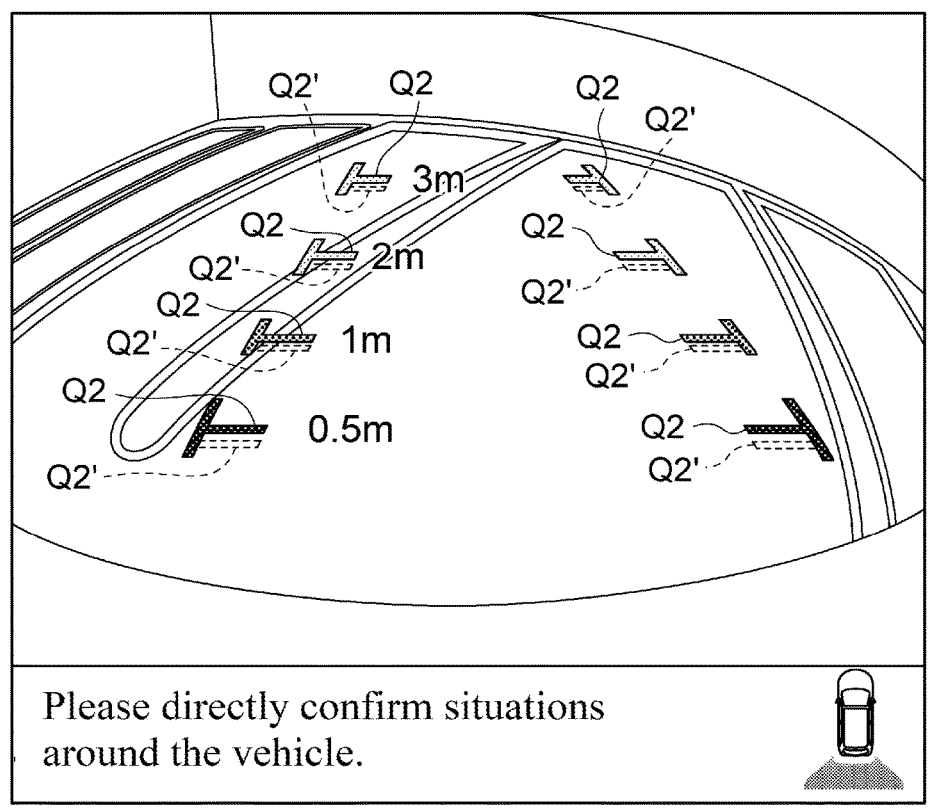
FIG. 7 is a view for describing a method of superimposing guide lines when no moving object exists around a subject vehicle or a moving object exists within a range of guide lines in a second embodiment of the present invention.

Specifically, when a moving object exists around the subject vehicle, the control device 10 uses the guide line superimposition function to first calculate a distance from the subject vehicle (camera 1) to the moving object. Then, the control device 10 uses the guide line superimposition function to determine whether or not the moving object exists within a range of the guide lines, on the basis of the calculated distance to the moving object. For example, the control device 10 according to the present embodiment uses the guide line superimposition function to display distance guide lines Q2 such that, as illustrated in FIG. 7, the distance guide lines Q2 are superimposed at positions at which respective distances from the subject vehicle (camera 1) are 0.5 m, 1.0 m, 2.0 m, and 3.0 m. In this case, the distance guide lines Q2 represent distances up to 3.0 m from the subject vehicle and the range of guide lines is thus a distance range of 3.0 m from the subject vehicle. When the distance from the subject vehicle to the moving object exceeds 3.0 m, therefore, the control device 10 uses the guide line superimposition function to determine that the moving object exists outside the range of guide lines. When the distance from the subject vehicle to the moving object is 3.0 m or less, the control device 10 uses the guide line superimposition function to determine that the moving object exists within the range of guide lines.

Figure 8:
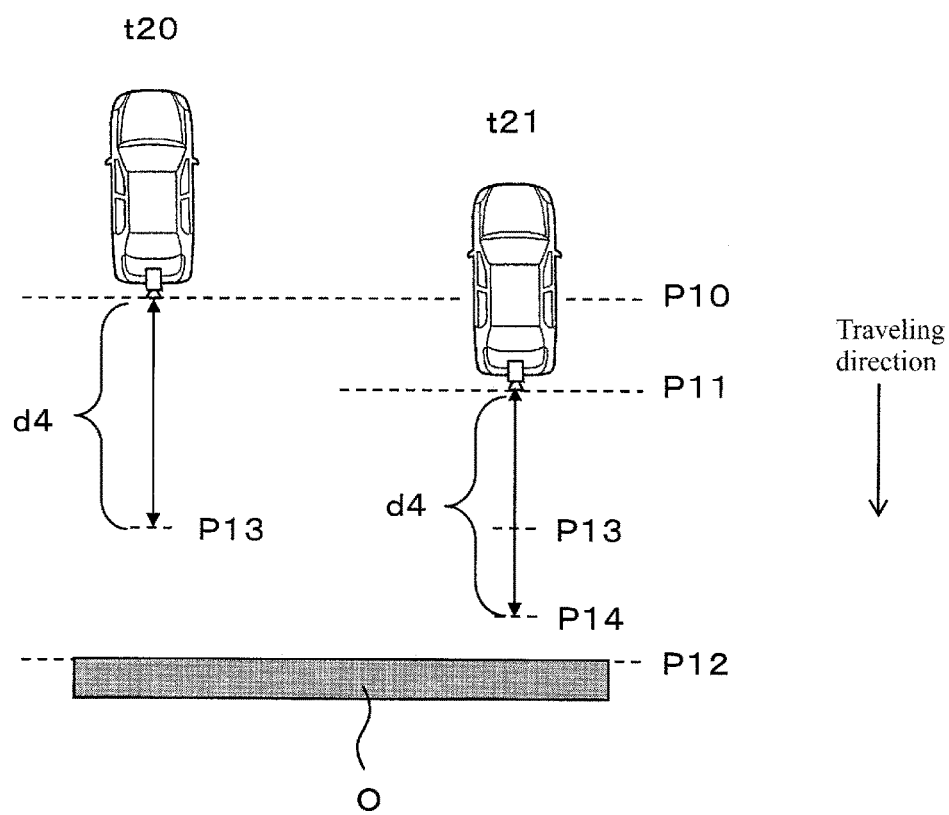
FIG. 8 is a view for describing the method of superimposing guide lines when no moving object exists around the subject vehicle or a moving object exists within the range of guide lines in the second embodiment of the present invention.

Then, when no moving object exists around the subject vehicle or a moving object exists within the range of guide lines, the control device 10 uses the guide line superimposition function to display each distance guide line Q2 such that, as illustrated in FIG. 7, the distance guide line Q2 is superimposed at a position at the traveling direction side of the subject vehicle than the reference position Q2' at which the distance from the subject vehicle is a distance represented by the distance guide line Q2. Here, FIG. 8 exemplifies a scene in which the subject vehicle travels backward and the image captured at a time t20 is presented to the driver at a time t21 because the wireless communication is delayed. In this case, when the subject vehicle travels to a position P11 at the time t21, the image captured at a position P10 is presented to the driver. At the time t21, therefore, even though the position at which the distance from the subject vehicle is a distance (e.g. 1.0 m from the subject vehicle) represented by the distance guide line Q2 is P13 on the image, the position at which the actual distance from the subject vehicle is a distance (e.g. 1.0 m from the subject vehicle) represented by the distance guide line Q2 is P14. Accordingly, when no moving object exists around the subject vehicle or a moving object exists within the range of guide lines, in order that each distance guide line Q2 in the image represents an actual distance from the subject vehicle, the control device 10 uses the guide line superimposition function to display the distance guide line Q2 such that the distance guide line Q2 is superimposed at the position P14 at the traveling direction side of the subject vehicle than the position P13 as the reference position Q2'. In this case, the control device 10 can use the guide line superimposition function to estimate the current position of the subject vehicle on the basis of the delay time of the wireless communication and/or the state of the subject vehicle and display each distance guide line Q2 such that the distance guide line Q2 is superimposed at a position at which the distance from the estimated current position is a distance represented by the distance guide line Q2. This allows each distance guide line Q2 to be displayed so as to represent the actual distance from the subject vehicle. FIG. 7 and FIG. 8 are views for describing a method of superimposing guide lines when no moving object exists around the subject vehicle or a moving object exists within the range of guide lines.

Figure 9:
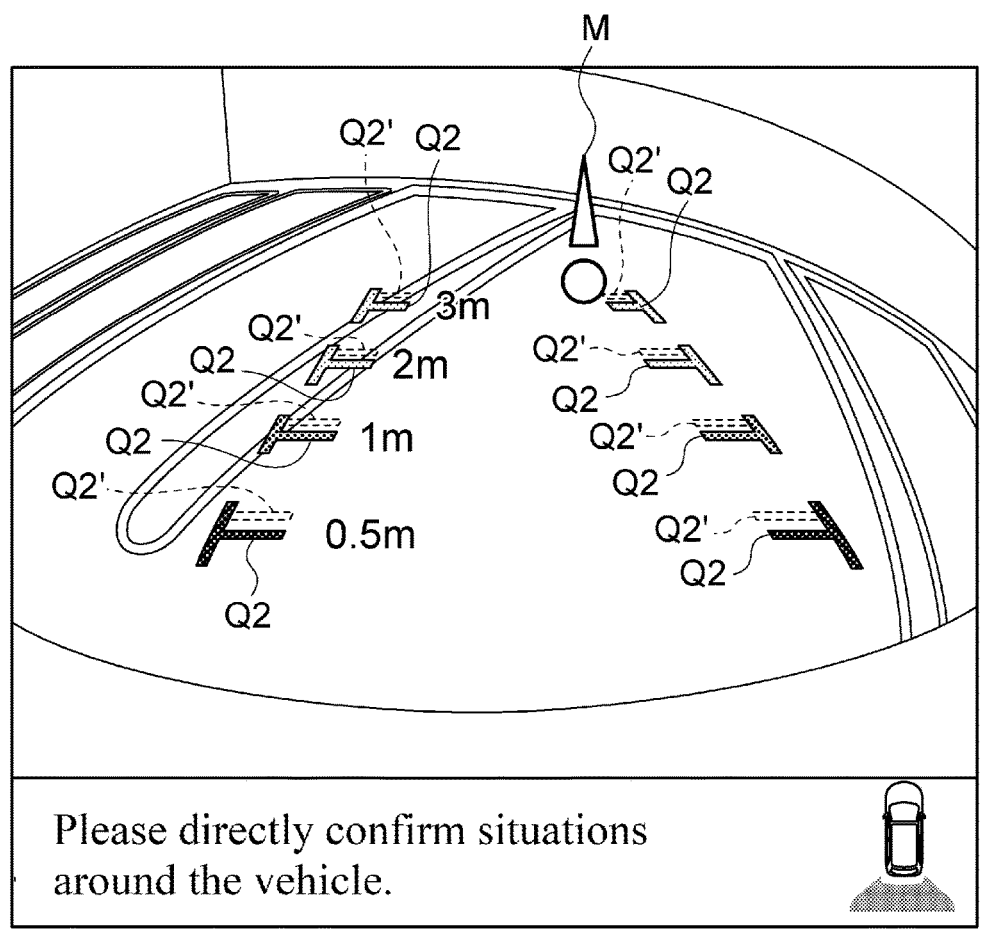
FIG. 9 is a view for describing a method of superimposing guide lines when a moving object exists outside the range of guide lines in the second embodiment of the present invention.

On the other hand, when a moving object exists outside the range of guide lines, the control device 10 uses the guide line superimposition function to display each distance guide line Q2 such that, as illustrated in FIG. 9, the distance guide line Q2 is superimposed at a position at the subject vehicle side (opposite side to the traveling direction of the subject vehicle) than the reference position Q2'. This allows the driver to recognize that a time and a space remain with some margin until the subject vehicle comes close to the moving object as compared with the case of superimposing the distance guide line Q2 at the reference position Q2'. FIG. 9 is a view for describing a method of superimposing guide lines when a moving object exists outside the range of guide lines.

When a moving object exists around the subject vehicle, the control device 10 uses the guide line superimposition function to display a marker M indicative of the moving object such that, as illustrated in FIG. 9, the marker M is superimposed on the image. When the wireless communication is delayed, the control device 10 uses the guide line superimposition function to display the marker M indicative of a moving object such that the marker M is superimposed at a position at the subject vehicle side than the actual position of the moving object. Specifically, the control device 10 uses the guide line superimposition function to estimate a traveling amount of the subject vehicle from the position at which the image is captured to the current position of the subject vehicle on the basis of the state information of the subject vehicle and the delay time of the wireless communication and display the marker M indicative of the moving object such that the marker M is superimposed at a position that is shifted from the actual position of the moving object toward the subject vehicle side by an amount corresponding to the estimated traveling amount. This allows the actual distance from the subject vehicle to the moving object to be displayed on the image even when the wireless communication is delayed.

Figure 10:
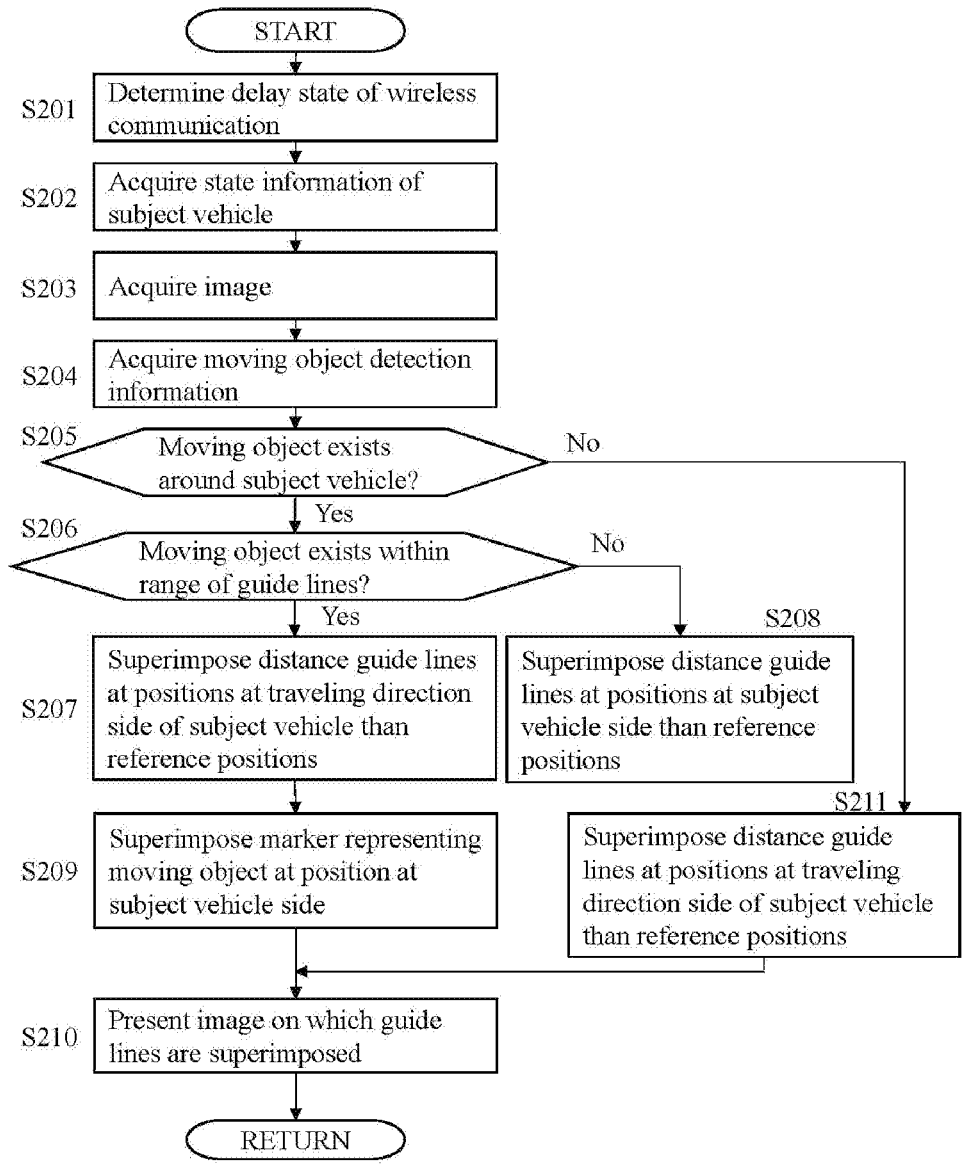
FIG. 10 is a flowchart illustrating an information presentation process according to the second embodiment of the present invention.

Next, the information presentation process according to the second embodiment will be described. FIG. 10 is a flowchart illustrating the information presentation process according to the second embodiment. The information presentation process illustrated in FIG. 10 is executed by the control device 10 of the terminal device 100.

In steps S201 to S203, as in steps S101 to S103 of the first embodiment, the delay state of the wireless communication between the terminal device 100 and the onboard device 200 is determined (step S201), the state information of the subject vehicle is acquired (step S202), and the image around the subject vehicle is acquired (step S203).

In step S204, the control device 10 uses the moving object detection information acquisition function to acquire the moving object detection information. Then, in step S205, the control device 10 uses the guide line superimposition function to determine whether or not a moving object exists around the subject vehicle, on the basis of the moving object detection information acquired in step S204. When no moving object exists around the subject vehicle, the routine proceeds to step S211 while when a moving object exists around the subject vehicle, the routine proceeds to step S206.

In step S206, the control device 10 uses the guide line superimposition function to determine whether or not the moving object exists within the range of guide lines. When the moving object exists within the range of guide lines, the routine proceeds to step S207 while when the moving object exists outside the range of guide lines, the routine proceeds to step S208.

In step S207, a determination is already made that the moving object exists within the range of guide lines, and the control device 10 therefore uses the guide line superimposition function to display each distance guide line Q2 such that, as illustrated in FIG. 7, the distance guide line Q2 is superimposed at a position at the traveling direction side of the subject vehicle than the reference position Q2', on the basis of the state information of the subject vehicle, such as a vehicle speed and steering angle, and the delay time of the wireless communication. This allows the actual distance from the subject vehicle to the moving object to be appropriately displayed on the image.

In step S208, a determination is already made that the moving object exists outside the range of guide lines, and the control device 10 therefore uses the guide line superimposition function to display each distance guide line Q2 such that, as illustrated in FIG. 9, the distance guide line Q2 is superimposed at a position at the subject vehicle side (opposite side to the traveling direction of the subject vehicle) than the reference position Q2', on the basis of the state information of the subject vehicle, such as a vehicle speed and steering angle, and the delay time of the wireless communication. This allows the driver to appropriately recognize that a time and a space remain with some margin until the subject vehicle comes close to the moving object as compared with the case of superimposing the distance guide line Q2 at the reference position Q2'.

In step S209, the control device 10 uses the guide line superimposition function to perform a process of superimposing a marker indicative of the moving object on the image. Specifically, the control device 10 uses the guide line superimposition function to display a marker M indicative of the moving object such that, as illustrated in FIG. 9, the marker M is superimposed at a position at the subject vehicle side than the actual position of the moving object, on the basis of the state information of the subject vehicle, such as a vehicle speed and steering angle, and the delay time of the wireless communication.

Then, in step S210, the control device 10 uses the information presentation function to present the image, on which the guide lines are superimposed in step S207 or S208 and the marker M indicative of the moving object is superimposed in step S209, on the screen of the display 30.

When, in step S205, a determination is made that no moving object exists around the subject vehicle, the routine proceeds to step S211. In step S211, as in step S207, in order that each distance guide line Q2 represents the actual distance from the subject vehicle, the control device 10 uses the guide line superimposition function to display the distance guide line Q2 such that the distance guide line Q2 is superimposed at a position at the traveling direction side of the subject vehicle than the reference position Q2'. This allows the actual distance from the subject vehicle to be appropriately displayed on the image. Then, the routine proceeds to step S110, in which the image on which the guide lines are superimposed in step S211 is presented on the screen of the display 30.

As described above, when the wireless communication is delayed and a moving object is detected, the information presentation system 1000 according to the second embodiment determines whether or not the moving object exists within the range of guide lines. When the moving object exists within the range of guide lines, in order that each distance guide line Q2 represents the actual distance from the subject vehicle, the distance guide line Q2 is displayed such that, as illustrated in FIG. 7, the distance guide line Q2 is superimposed at a position at the traveling direction side of the subject vehicle than the reference position Q2', on the basis of the state of the subject vehicle and the delay time. Through this operation, according to the second embodiment, the driver can appropriately recognize the actual distance from the subject vehicle to the moving object even when the wireless communication is delayed.

Moreover, in the second embodiment, when the wireless communication is delayed and a moving object exists outside the range of guide lines, each distance guide line Q2 is displayed such that, as illustrated in FIG. 9, the distance guide line Q2 is superimposed at a position at the subject vehicle side (opposite side to the traveling direction of the subject vehicle) than the reference position Q2'. This allows the driver to appropriately recognize that a time and a space remain with some margin until the subject vehicle comes close to the moving object as compared with the case of displaying the distance guide line Q2 such that the distance guide line Q2 is superimposed at the reference position Q2'.

Furthermore, in the second embodiment, when the wireless communication is delayed and a moving object does not exist around the subject vehicle, in order that each distance guide line Q2 represents the actual distance from the subject vehicle, the distance guide line Q2 is displayed such that, as illustrated in FIG. 7, the distance guide line Q2 is superimposed at a position at the traveling direction side of the subject vehicle than the reference position Q2'. Through this operation, when the wireless communication is delayed and a moving object does not exist around the subject vehicle, the actual distance from the subject vehicle can be appropriately displayed on the image using the distance guide lines Q2.

In addition, in the second embodiment, when the wireless communication is delayed and a moving object exists around the subject vehicle, a marker M indicative of the moving object is displayed such that, as illustrated in FIG. 9, the marker M is superimposed at a position at the subject vehicle side than the actual position of the moving object. Through this operation, even when the wireless communication is delayed, the actual distance from the subject vehicle to the moving object can be appropriately displayed on the image.

As will be understood, when the wireless communication is not delayed in the second embodiment, each distance guide line Q2 can be displayed such that, as in the first embodiment, the distance guide line Q2 is superimposed at the reference position Q2' at which the distance from the subject vehicle is a distance represented by the distance guide line Q2 (the same applies to the third embodiment, which will be described below).

Third Embodiment

Next, an information presentation system 1000 according to a third embodiment of the present invention will be described. The information presentation system 1000 according to the third embodiment has the same configuration as that of the information presentation system 1000 according to the first embodiment and performs similar operations to those of the information presentation system 1000 according to the first embodiment except that the information presentation system 1000 according to the third embodiment operates as described below.

In the third embodiment, the control device 10 uses the delay state determination function, as in the first embodiment, to determine a delay state of the wireless communication between the terminal device 100 and the onboard device 200. In the third embodiment, the control device 10 uses the delay state determination function to determine a delay state of the wireless communication from among a communication disruption state, a normal delay state, and an abnormal delay state.

Specifically, when the delay time of the wireless communication is a predetermined period of time (e.g. 200 msec) or shorter, the control device 10 uses the delay state determination function to determine that the delay state of the wireless communication is in the normal delay state. When the delay time of the wireless communication is longer than the predetermined period of time, the control device 10 uses the delay state determination function to determine that the delay state of the wireless communication is in the abnormal delay state. When the wireless communication cannot be established between the terminal device 100 and the onboard device 200, the control device 10 uses the delay state determination function to determine that the delay state of the wireless communication is in the communication disruption state.

In the third embodiment, the control device 10 uses the guide line superimposition function to change the display mode for guide lines on the basis of the delay state of the wireless communication between the terminal device 100 and the onboard device 200. Specifically, the control device 10 uses the guide line superimposition function to change the display mode for guide lines in accordance with the delay state of the wireless communication (communication disruption state, normal delay state, or abnormal delay state) so that the driver can recognize which state of the communication disruption state, normal delay state, and abnormal delay state the delay state of the wireless communication is in. Here, FIGS. 11 to 13(B) are views for describing display modes for guide lines in the third embodiment.

Figure 11:
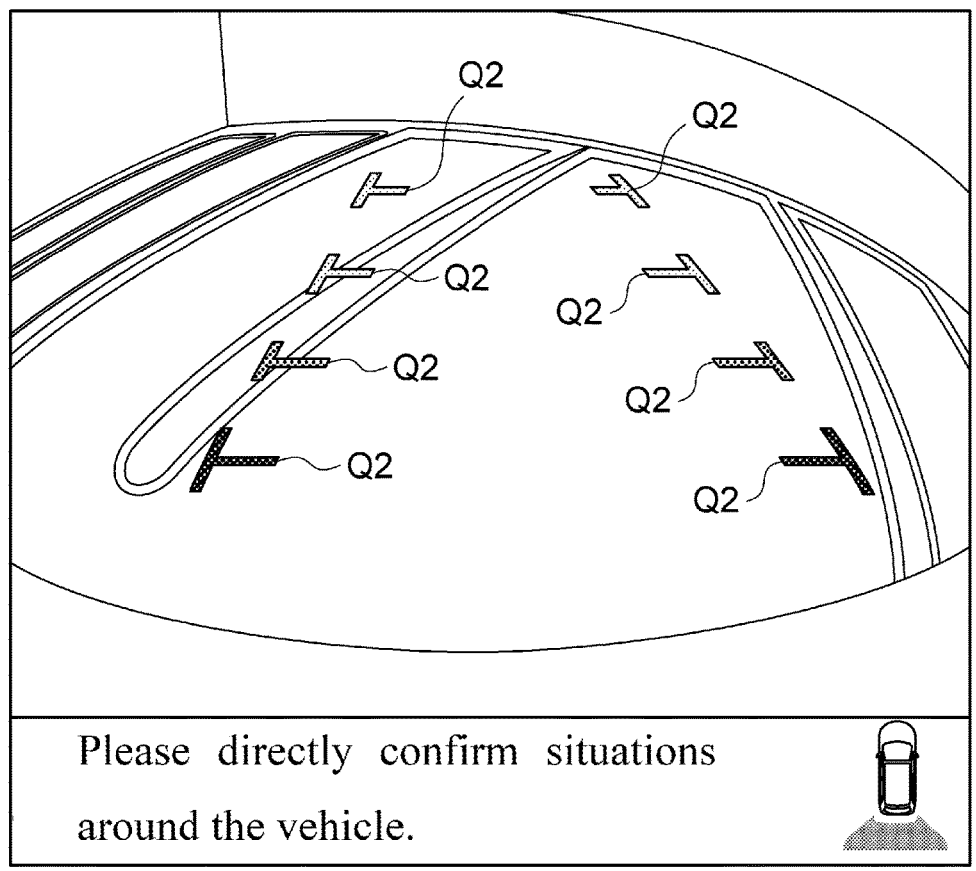
FIG. 11 is a view for describing a display mode for guide lines in a third embodiment of the present invention when the wireless communication is in a normal delay state.

For example, when a determination is made that the delay state of the wireless communication is in the normal delay state, the control device 10 uses the guide line superimposition function to display each distance guide line Q2 such that, as illustrated in FIG. 11, the distance guide line Q2 is superimposed at a position at the traveling direction side of the subject vehicle than the reference position Q2'.

Figure 12:
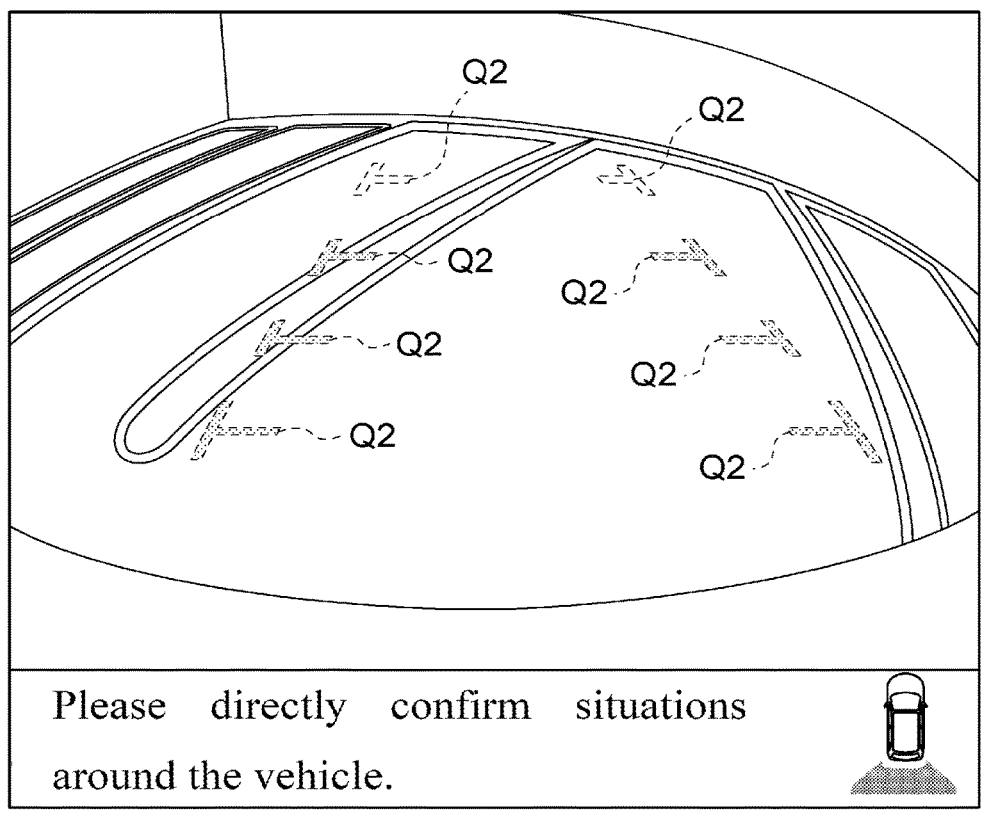
FIG. 12 is a view for describing a display mode for guide lines in the third embodiment of the present invention when the wireless communication is in an abnormal delay state.

When a determination is made that the delay state of the wireless communication is in the abnormal delay state, the control device 10 uses the guide line superimposition function to display the guide lines in a dimmed color as compared with the normal delay state or display the guide lines as broken lines, as illustrated in FIG. 12. This allows the driver to appropriately recognize that the wireless communication between the terminal device 100 and the onboard device 200 is in the abnormal delay state. In the scene illustrated in FIG. 12, the wireless communication is delayed and the control device 10 therefore uses the guide line superimposition function to display each distance guide line Q2 such that, as in the scene illustrated in FIG. 11, the distance guide line Q2 is superimposed at a position at the traveling direction side of the subject vehicle than the reference position Q2'.

Figure 13A:
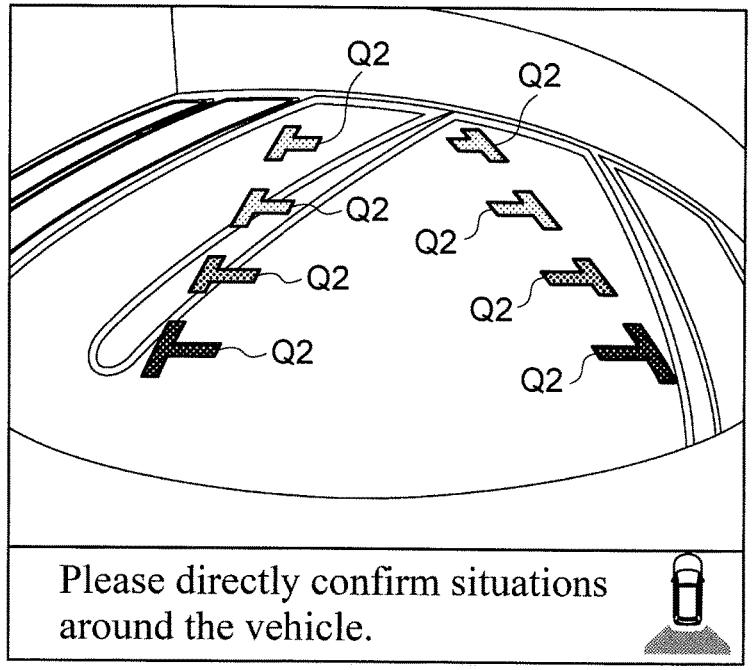
FIGS. 13(A)-13(B) is a view for describing a display mode for guide lines in the third embodiment of the present invention when the wireless communication is in a communication disruption state.
Figure 13B:
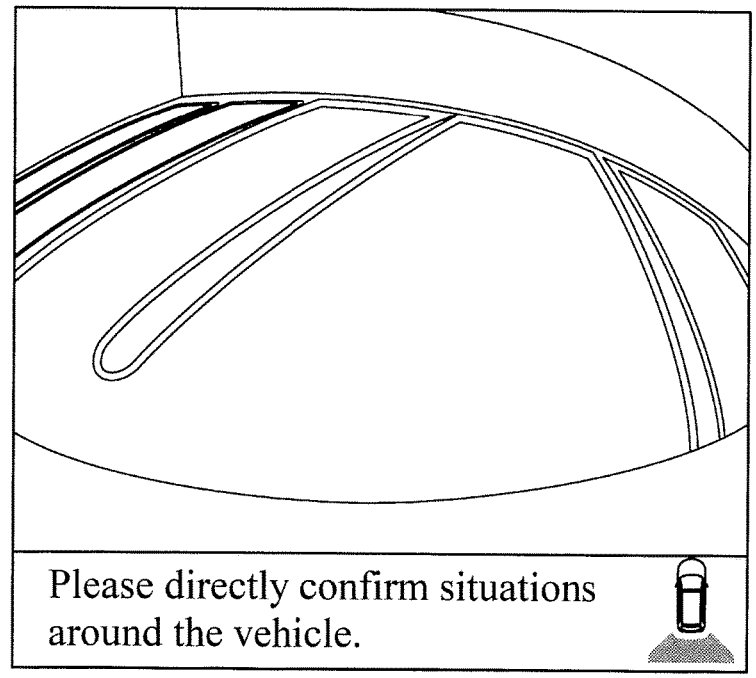

When a determination is made that the delay state of the wireless communication is in the communication disruption state, the control device 10 uses the guide line superimposition function to first display the guide lines in an emphasized manner than the normal delay state, as illustrated in FIG. 13(A). For example, the control device 10 can use the guide line superimposition function to display the guide lines in a deeper color than the normal delay state or display the guide lines as bold lines, thereby to display the guide lines in an emphasized manner than the normal delay state. Then, after a certain period of time passes from the emphasized display of guide lines, the control device 10 uses the guide line superimposition function to hide the guide lines, as illustrated in FIG. 13(B). This allows the driver to appropriately recognize that the wireless communication between the terminal device 100 and the onboard device 200 is in the communication disruption state. Also in the scene illustrated in FIGS. 13(A)-13(B), when the distance guide lines Q2 are displayed in an emphasized manner, each distance guide line Q2 can be displayed such that, as in the scenes illustrated in FIGS. 11 and 12, the distance guide line Q2 is superimposed at a position at the traveling direction side of the subject vehicle than the reference position Q2'.

Figure 14:
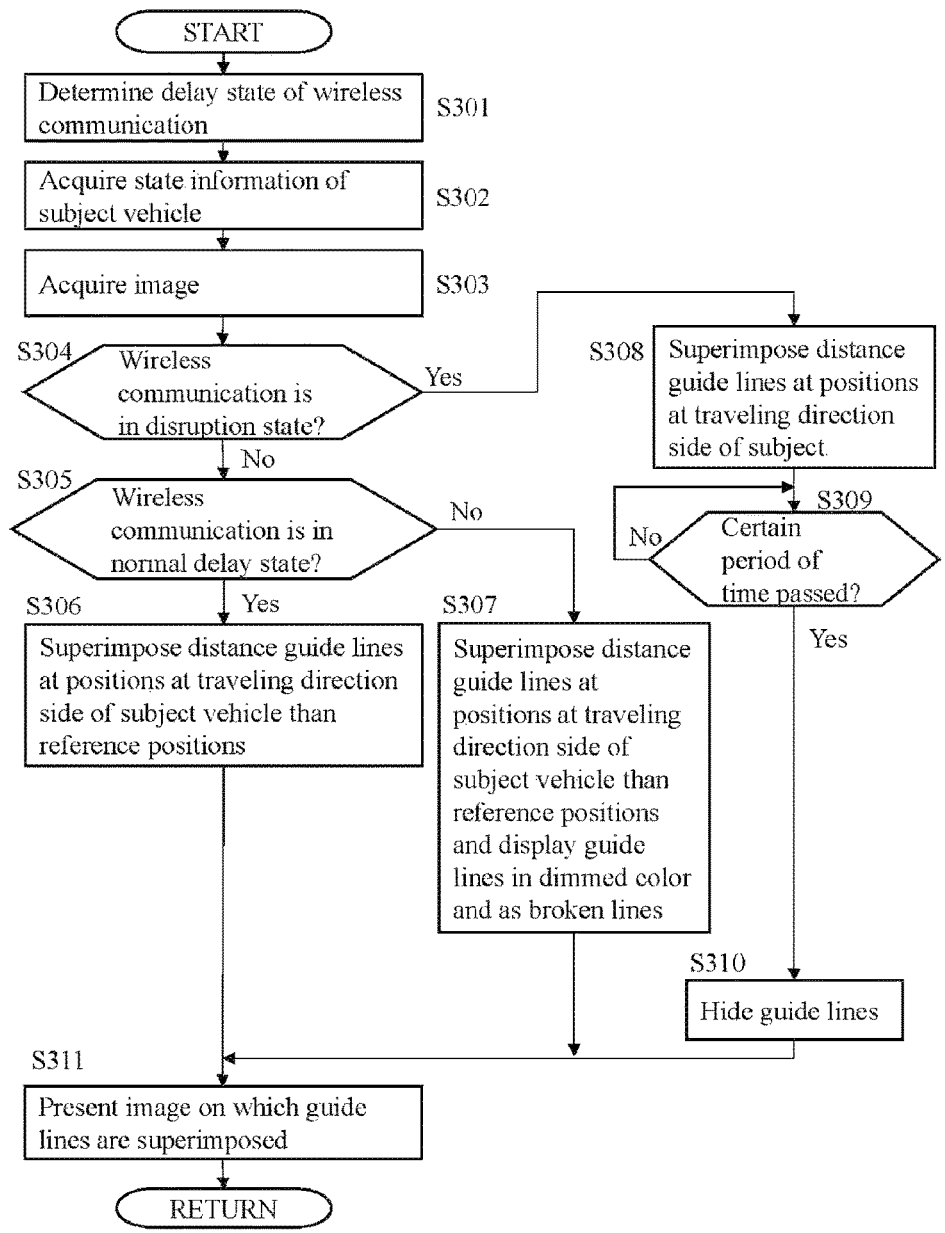
FIG. 14 is a flowchart illustrating an information presentation process according to the third embodiment of the present invention.

Next, the information presentation process according to the third embodiment will be described. FIG. 14 is a flowchart illustrating the information presentation process according to the third embodiment. The information presentation process illustrated in FIG. 14 is executed by the control device 10 of the terminal device 100.

In steps S301 to S303, as in steps S101 to S103 of the first embodiment, the delay state of the wireless communication between the terminal device 100 and the onboard device 200 is determined (step S301), the state information of the subject vehicle is acquired (step S302), and the image around the subject vehicle is acquired (step S303). In step S301, a determination is made which state of the communication disruption state, normal delay state, and abnormal delay state the delay state of the wireless communication is in.

In step S304, the control device 10 uses the guide line superimposition function to determine whether or not the delay state of the wireless communication between the terminal device 100 and the onboard device 200 is in the communication disruption state, on the basis of the determination result in step S301. When a determination is made that the delay state is in the communication disruption state, the routine proceeds to step S308 while when a determination is made that the delay state is not in the communication disruption state, the routine proceeds to step S305.

In step S305, the control device 10 uses the guide line superimposition function to determine whether or not the delay state of the wireless communication is in the normal delay state. For example, when the delay time of the wireless communication is a certain period of time or shorter and a determination is made that the delay state is in the normal delay state, the routine proceeds to step S306 while when the delay time of the wireless communication is longer than the certain period of time and a determination is made that the delay state is in the abnormal delay state, the routine proceeds to step S307.

In step S306, a determination is already made that the delay state of the wireless communication is in the normal delay state and the control device 10 therefore uses the guide line superimposition function to display each distance guide line Q2 such that, as illustrated in FIG. 11, the distance guide line Q2 is superimposed at a position at the traveling direction side of the subject vehicle than the reference position Q2'.

Also in step S307, a determination is already made that the wireless communication is delayed and the control device 10 therefore uses the guide line superimposition function to display each distance guide line Q2 such that, as illustrated in FIG. 12, the distance guide line Q2 is superimposed at a position at the traveling direction side of the subject vehicle than the reference position Q2'. In step S307, a determination is already made that the delay state of the wireless communication is in the abnormal delay state and the control device 10 therefore uses the guide line superimposition function to display the guide lines in a dimmed color as compared with the case of normal delay state and display the guide lines as broken lines. This allows the driver to appropriately recognize that delay state of the wireless communication is in the abnormal delay state.

When, in step S304, a determination is made that the delay state of the wireless communication is in the communication disruption state, the routine proceeds to step S308. In step S308, the control device 10 uses the guide line superimposition function to display the guide lines in an emphasized manner, as illustrated in FIG. 13(A), and each distance guide line Q2 is displayed such that the distance guide line Q2 is superimposed at a position at the traveling direction side of the subject vehicle than the reference position Q2'.

Step S308 is followed by step S309 in which the control device 10 uses the guide line superimposition function to determine whether or not a certain period of time passes after the guide lines are displayed in an emphasized manner. The routine waits in step S309 until the certain period of time passes, and proceeds to step S310 when the certain period of time passes. In step S310, the control device 10 uses the guide line superimposition function to hide the guide lines. Thus, when the delay state of the wireless communication is in the communication disruption state, the guide lines are displayed in an emphasized manner and then hidden thereby to allow the driver to appropriately recognize that the delay state of the wireless communication is in the communication disruption state.

In step S311, the control device 10 uses the information presentation function to display the image, on which the guide lines are superimposed in step S306, S307, or S308, on the screen of the display 30.

As described above, the information presentation system 1000 according to the third embodiment changes the display mode for guide lines on the basis of the delay state of the wireless communication between the terminal device 100 and the onboard device 200. For example, when the delay state of the wireless communication is in the abnormal delay state, the guide lines are displayed in a specific form, such as in a dimmed color and as broken lines, as compared with the case of the normal delay state. When the delay state of the wireless communication is in the communication disruption state, the guide lines are displayed in an emphasized manner as compared with the normal delay state and then hidden. Through this operation of the third embodiment, the driver is allowed to appropriately recognize the delay state of the wireless communication.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in one or more the above-described embodiments, the information presentation system has been described with reference to the terminal device 100 and the information presentation system 1000, but the present invention is not limited to this.

In one or more of the above-described embodiments, the information presentation system has been described with reference to the information presentation system 1000 comprising the terminal device 100, which comprises the control device 10 including the CPU 11, ROM 12, and RAM 13, and the onboard device 200, but the present invention is not limited to this.

In one or more of the above-described embodiments, the onboard device having a camera and a communication function has been described with reference to the onboard device 200 which comprises the cameras 1, the communication device 2, the vehicle controller 3, and the modules 4, but the present invention is not limited to this.

In one or more of the above-described embodiments, examples have been described in which the guide lines are displayed so as to be superimposed on a back view image captured behind the subject vehicle, but the present invention is not limited to these examples. In one or more embodiments of the present invention, the guide lines can be displayed so as to be superimposed on a front view image captured ahead of the subject vehicle or a sideward view image captured at a side of the subject vehicle. In an alternative embodiment of the present invention, a projection image may be generated by projecting a plurality of images captured by a plurality of cameras 1 onto a projection plane in which the subject vehicle is viewed from a virtual viewpoint above the subject vehicle, and the guide lines can be displayed so as to be superimposed on the projection image. Also in this case, on the basis of the vehicle speed, acceleration, and steering angle of the subject vehicle and the delay time of the wireless communication, each guide line can be displayed such that the guide line is superimposed at a position at the subject vehicle side than the reference position Q2' or a position at the traveling direction side of the subject vehicle than the reference position Q2'.

In one or more of the above-described embodiments, examples have been described in which, when the wireless communication is delayed, each distance guide line Q2 is displayed such that the distance guide line Q2 is superimposed at either of a position at the subject vehicle side than the reference position Q2' and a position at the traveling direction side of the subject vehicle than the reference position Q2', but the present invention is not limited to these examples. In one or more embodiments of the present invention, part of the distance guide lines Q2 can be displayed so as to be each superimposed at a position at the subject vehicle side than the reference position Q2' and the other distance guide lines Q2 can be displayed so as to be each superimposed at a position at the traveling direction side of the subject vehicle than the reference position Q2'. For example, with regard to distance guide lines Q2 that represent distances within a certain distance from the subject vehicle, they can be displayed so as to be each superimposed at a position at the subject vehicle side than the reference position Q2' while, with regard to distance guide lines Q2 that represent distances beyond the certain distance from the subject vehicle, they can be displayed so as to be each superimposed at a position at the traveling direction side of the subject vehicle than the reference position Q2'.

In one or more of the above-described embodiments, examples have been described in which the guide lines, which include the vehicle width guide lines Q1 and the distance guide lines Q2, are displayed so as to be superimposed on the image. In addition to this, a predicted route line P can be displayed so as to be further superimposed on the image. The predicted route lime P represents a trajectory on which the subject vehicle is predicted to travel.

In the above-described first embodiment, an example has been described in which, when the wireless communication is delayed, each distance guide line Q2 is displayed such that, as illustrated in FIG. 5, the distance guide line Q2 is superimposed at a position at the subject vehicle side than the reference position Q2', but the present invention is not limited to this example. In one or more embodiments of the present invention, each distance guide line Q2 can be displayed such that, as illustrated in FIG. 7, for example, the distance guide line Q2 is superimposed at a position at the traveling direction side of the subject vehicle side than the reference position Q2'. In this case, the driver can be allowed to recognize the actual distance from the subject vehicle on the image.

In the above-described second embodiment, an example has been described in which, when the wireless communication is delayed and no moving object exists around the subject vehicle or a moving object exists outside the range of guide lines, in order that each distance guide lines Q2 represents the actual distance from the subject vehicle, the distance guide line Q2 is displayed so as to be superimposed at a position at the traveling direction side of the subject vehicle side than the reference position Q2', but the present invention is not limited to this example. For example, provided that each distance guide line Q2 is superimposed at a position at the traveling direction side of the subject vehicle side than the reference position Q2', the distance guide lines Q2 may be displayed so as to be superimposed at a position that does not correspond to the actual distance from the subject vehicle (e.g. a position that is shifted from the reference position Q2' toward the traveling direction side of the subject vehicle by a predetermined distance). Also in this case, the distance represented by the distance guide line Q2 can be presented to the driver as a distance closer to the actual distance from the subject vehicle.

In the above-described third embodiment, an example has been described in which the display mode for guide lines is changed on the basis of the delay state of the wireless communication, but the display mode for guide lines corresponding to each delay state is not limited to the above-described examples and can be appropriately set. For example, in addition or alternatively to the color, width, and form (such as broken lines) of the guide lines, the transparency of guide lines may be changed or the guide lines may be displayed to blink on and off. For example, when the communication state of the wireless communication is in the abnormal delay state, the transparency of guide lines can be increased or the guide lines can be displayed to blink on and off. When the communication state of the wireless communication is in the communication disruption state, the transparency of guide lines may be first reduced and then increased. In one or more embodiments of the present invention, the guide lines may be displayed to blink on and off instead of hiding the guide lines. In the case of the normal delay state, the guide lines may be displayed as lines of a retreating color, such as blue, green and blue-violet, which is relatively not distinguishable, broken lines, and/or relatively narrow lines, while in the case of the abnormal delay state, the guide lines may be displayed as lines of an advancing color, such as red, orange and yellow, which is relatively distinguishable, solid lines, and/or relatively wide lines.

In the above-described second embodiment, an example has been described in which a moving object existing around the subject vehicle is detected, but an obstacle (such as a wall and curbstone) existing around the subject vehicle may be detected. Also in this case, positions for superimposing the distance guide lines Q2 can be determined as in the above embodiments on the basis of a determination as to whether an obstacle exists around the subject vehicle, a determination as to whether the obstacle exists within the range of guide lines, and/or other determination.

In the control device 10 according to one or more of the above-described embodiments, the image acquisition function corresponds to the image acquisition device, the guide line superimposition function corresponds to the vehicle information acquisition device and superimposition device, the delay state determination function corresponds to the determination device, and the moving object detection information acquisition function corresponds to the obstacle information acquisition device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

1000 Information presentation system

| | | | | |
|---|---|---|---|---|
| 100 | Terminal device | | | |
| | 10 | Control device | | |
| | | 11 | CPU | |
| | | 12 | ROM | |
| | | 13 | RAM | |
| | 20 | Communication device | | |
| | 30 | Display | | |
| 200 | Onboard device | | | |
| | 1, 1a to 1d | Camera | | |
| | 2 | Communication device | | |
| | 3 | Vehicle controller | | |
| | 4 | Modules | | |
| | | 41 | Steering control device | |
| | | 42 | Acceleration sensor | |
| | | 43 | Moving object detection device | |

The invention claimed is:

1. An information presentation system comprising:
an onboard device including a camera provided on a vehicle; and
a terminal device having portability and performing wireless communication with the onboard device,
wherein the terminal device is configured to:
acquire an image around the vehicle captured by the camera;
superimpose a distance marker on the image, the distance marker representing a distance from the vehicle;
determine a delay state including a delay time of the wireless communication between the onboard device and the terminal device; and
present the image on which the distance marker is superimposed,
wherein, when the wireless communication is not delayed, the terminal device superimposes the distance marker on the image at a reference position at which a distance from the vehicle is a distance represented by the distance marker, and
wherein, when the wireless communication is delayed, the terminal device superimposes the distance marker on the image at a position at a traveling direction side of the vehicle than the reference position or a position at the vehicle side than the reference position.

2. The information presentation system according to claim 1, wherein the terminal device acquires state information of the vehicle, estimates a traveling amount from a position of the vehicle when capturing the image to a current position of the vehicle on a basis of the state information of the vehicle and the delay time of the wireless communication, and superimposes the distance marker at a position shifted from the reference position toward the traveling direction side of the vehicle or toward the vehicle side by the traveling amount.

3. The information presentation system according to claim 1, wherein the terminal device superimposes the distance marker at a position shifted from the reference position toward the traveling direction side of the vehicle or toward the vehicle side by a predetermined traveling amount.

4. The information presentation system according to claim 1,
wherein the terminal device acquires information on an obstacle existing around the vehicle, and
wherein the terminal device determines a position for superimposing the distance marker with reference to the information on the obstacle.

5. The information presentation system according to claim 4, wherein, when the wireless communication is delayed and the obstacle is not detected, the terminal device superimposes the distance marker at the traveling direction side of the vehicle than the reference position.

6. The information presentation system according to claim 4, wherein, when the wireless communication is delayed and the obstacle exists within a distance range from the vehicle represented by the distance marker in the image, the terminal device superimposes the distance marker at the traveling direction side of the vehicle than the reference position.

7. The information presentation system according to claim 4, wherein, when the wireless communication is delayed and the obstacle exists outside a distance range from the vehicle represented by the distance marker in the image, the terminal device superimposes the distance marker at the vehicle side than the reference position.

8. The information presentation system according to claim 4, wherein, when the obstacle exists, the terminal device superimposes a marker representing a position of the obstacle at a position at the vehicle side than an actual position of the obstacle.

9. The information presentation system according to claim 1, wherein the terminal device changes a display mode for the distance marker on the image in accordance with the delay state of the wireless communication.

* * * * *